US006950239B2

(12) United States Patent
Tang

(10) Patent No.: US 6,950,239 B2
(45) Date of Patent: Sep. 27, 2005

(54) METHOD FOR MAKING MICRO-LENS ARRAY

(76) Inventor: Yin S. Tang, 201 Rockview, Irvine, CA (US) 92612

( * ) Notice: Subject to any disclaimer, the term of this patent is extended or adjusted under 35 U.S.C. 154(b) by 8 days.

(21) Appl. No.: 10/754,365

(22) Filed: Jan. 8, 2004

(65) Prior Publication Data

US 2005/0152044 A1 Jul. 14, 2005

(51) Int. Cl.[7] .................. G02B 27/10; C03B 23/22; B29D 11/00
(52) U.S. Cl. .................. 359/626; 65/37; 264/1.1
(58) Field of Search ............ 264/1.32, 1.34, 264/1.36, 2.6, 1.1; 65/433, 37; 359/619, 359/620, 626; 385/115, 116, 120

(56) References Cited

U.S. PATENT DOCUMENTS

| | | | |
|---|---|---|---|
| 3,216,807 A | * 11/1965 | Woodcock | 65/411 |
| 4,541,727 A | 9/1985 | Rosenthal | 368/232 |
| 6,129,866 A | 10/2000 | Hamanaka et al. | 264/1.7 |
| 6,335,828 B1 | 1/2002 | Hashimoto et al. | 359/443 |
| 6,582,988 B1 | 6/2003 | Hsiao et al. | 438/70 |
| 6,654,174 B1 | 11/2003 | Huang | 359/619 |

OTHER PUBLICATIONS

B. Volckaerts et al., *The Fabrication of Cylindrical Micro-Lens Arrays with Deep Lithography with Protons*, Cyclotron Department VUB, Laarbeeklaan 103, 1090 Brussels, Belgium, 2002.

* cited by examiner

Primary Examiner—David N. Spector
(74) Attorney, Agent, or Firm—MacPherson Kwok Chen & Heid LLP; Tom Chen

(57) ABSTRACT

A method for manufacturing a light controlling structure, generally referred to as a microlens or microlens array. The method including providing a bundle of optically transparent members; cutting the bundle of optically transparent members to form at least one sheet of optically transparent member segments; and heating the at least one end of the at least one sheet of optically transparent member segments to form lens surfaces thereon.

20 Claims, 6 Drawing Sheets

METHOD FOR MAKING MICRO-LENS ARRAY

TECHNICAL FIELD

This invention relates to light controlling structures, and more particularly to a method of making a microlens array for imaging systems, optical scanning systems, photo copying machines and the like.

BACKGROUND

Microlens arrays provide optical versatility in a miniature package for imaging applications. Traditionally, a microlens is defined as a lens with a diameter less than one millimeter; however, a lens having a diameter as large as five millimeters has sometimes also been considered a microlens.

One commonly used technique for manufacturing microlenses begins by coating a substrate with a selected photoresist, exposing the photoresist coated substrate to radiation through a mask, or alternatively, subjecting the photoresist to gray scale laser exposure. Upon heating the substrate, the exposed photoresist melts and surface tension pulls the material in the form of convex lenses. The depth of the photoresist determines the focal length of the lens.

Another method for the manufacture of microlenses is to use ion exchange. In this method, ions are diffused into a glass rod to give a radial refractive index distribution. The index of refraction is highest in the center of the lens and decreases quadratically as a function of radial distance from the central axis. Microlenses made using the ion exchange method are used to collimate light from fibers as, for example, in telecommunications.

Users of microlenses are moving away from discrete microlenses towards microlens arrays. One manufacturing process for the production of glass microlens arrays generally involves reactive ion etching (RIE) of fused silica. In general, it is very difficult to meet all the requirements of microlens arrays using RIE. The RIE technology involves many steps before the final product can be produced and thus the yield is typically poor and the products are costly.

Compression molding of optical quality glass to form microlens arrays is also well known. This method includes compressing optical element preforms, generally known as gobs, at high temperatures to form a glass lens element. In the compression molding process, a gob is inserted into a mold cavity. The mold resides within an oxygen-free chamber during the molding process. The gob is generally placed on the lower mold and heated above the glass transition temperature and near the glass softening point. The upper mold is then brought in contact with the gob and pressure is applied to conform the gob to the shape of the mold cavity. After cooling, the lens is removed from the mold.

Unfortunately, compression molding an array of microlenses using one or more preforms is subject to many difficulties which include alignment of mechanical and optical axes of each lens element with respect to a common axis, and location of each lens element with respect to a reference point in the array. Furthermore, it is extremely difficult to machine convex aspheric mold cavities using conventional techniques if the microlens diameter is less than 1 mm.

Microlens arrays are generally formed on the top surfaces of silicon chips, either light-sensitive (e.g., CCDs) or light-emitting (e.g., micro-display devices). A planarization layer is first formed over the silicon substrate. A color filter layer is next formed over the planarization layer with sub-pixel areas properly aligned with active devices in the silicon substrate. Another planarization layer is generally formed over the color filter layer and, finally a photoresist material is deposited over the second planarization layer. Conventional lithographic techniques are then utilized to form rectangular patterns in the photoresist. After exposure, a development step removes the photoresist in the exposed areas leaving the central island regions over the pixel-active areas transparent. Development and sometimes etching, removes the photoresist material between these central regions and forms trenches in the photoresist area separating the islands of photoresist now defining the individual microlens sites. A deep plasma etch into the silicon substrate next removes all layers above the substrate. Photoresist is then stripped and the devices are hard-baked to reflow the micro lenses into the proper optical form by controlling time and temperature.

Consequently, there is a need for an improved method of forming microlens arrays which may not involve the conventional techniques, but a novel process using bundles of optically transparent materials.

SUMMARY

The present invention provides a method for manufacturing a light controlling structure, generally referred to as a microlens or microlens array for imaging systems, optical scanning systems, photo copying machines and the like.

In one aspect of the invention, a method is provided for manufacturing a microlens array. The method includes adhering or binding together a bundle of optically transparent members, such as rods or fibers. The bundle of optically transparent members is cut to form sheets of member segments. The cross-section or faces of the sheet can resemble a close-packed hexagonal structure. The faces are polished to smooth out any rough edges created by the cutting process. If desired, one or both faces or ends of the sheets can be modified to shape the ends into a desired shape. The modified ends are exposed to an energy source, such as a heat source, electrical spike, laser light and the like, which causes the end of each member segment to form a lens segment.

Advantageously, the microlens array manufactured by the method of the present invention can be made small or large. For example, the size of the microlens array can be made from less than about 10 μm square to greater than a 70 in.×70 in. wall display unit. Unlike other microlens array manufacturing methods, each lens element is made with a high degree of lens size uniformity. As described in further detail below, the lens element arrangement in array can be fixed according to different applications.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
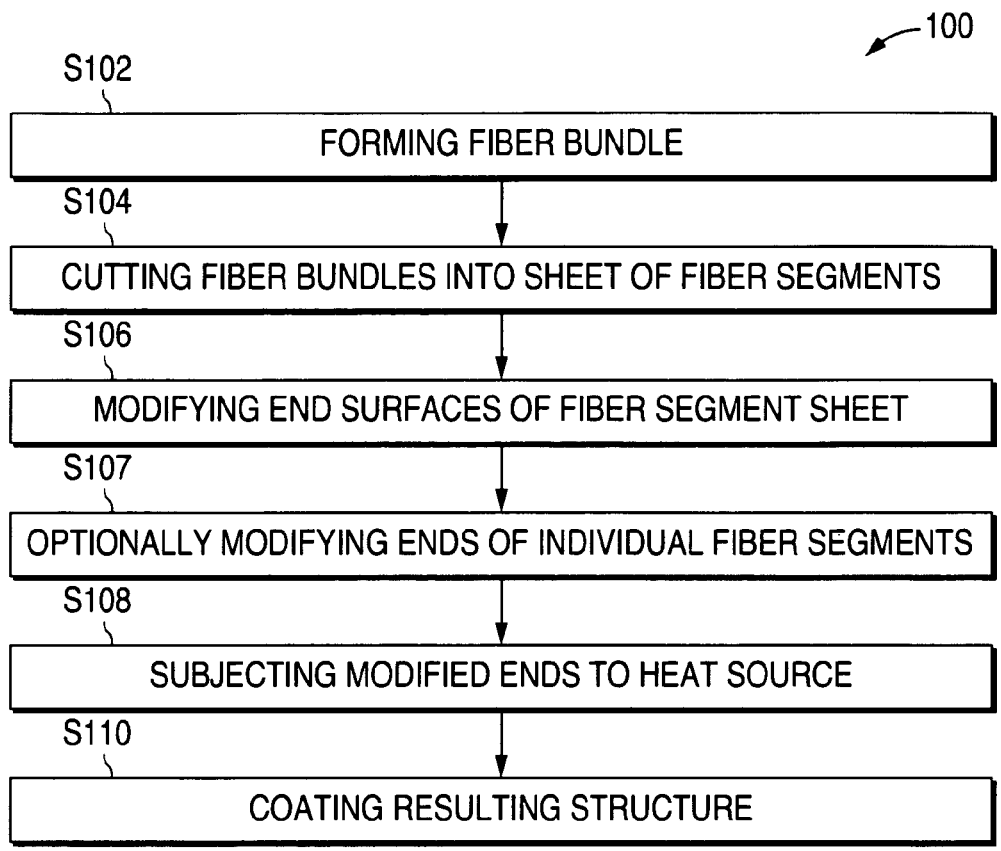
FIG. 1 is a flowchart illustrating the method of the present invention in accordance with one embodiment thereof.

FIG. 1 is a flowchart illustrating the method 100 of the present invention. The method includes providing a bundle of optically transparent members, such as optically transparent rods or fibers made of glass, plastic and the like (s102). The bundle of optically transparent members is cut or sliced into a sheet or sheets of optically transparent member segments (s104), where each sheet has a first face and second face. The thickness of each sheet can be made to any desired thickness.

The ends of each optically transparent member segment in each sheet can be polished so as to create a smooth end. Method 100 may also include modifying one or both faces of the sheets (s106) to form the face of the sheet into a surface that varies from a flat surface to a more rounded surface.

Optionally, the end of each transparent member segment can be modified (s107) so as to create variable sized and shaped lens structures during the lens element formation process. Segment modification to all member segments in the sheet is performed after one or both faces of the sheet have been varied from a flat surface (s106).

As described in greater detail below, one or both faces of each sheet of optically transparent member segments are subjected to an energy source that can provide a heating treatment, which causes a lens element to form on the end or ends of the optically transparent member segments (s108). In addition, the newly formed array of lens elements can be coated (s110), if desired, using a thin film. The coating can include an antireflection or antiglare material for display screen applications.

Figure 2:
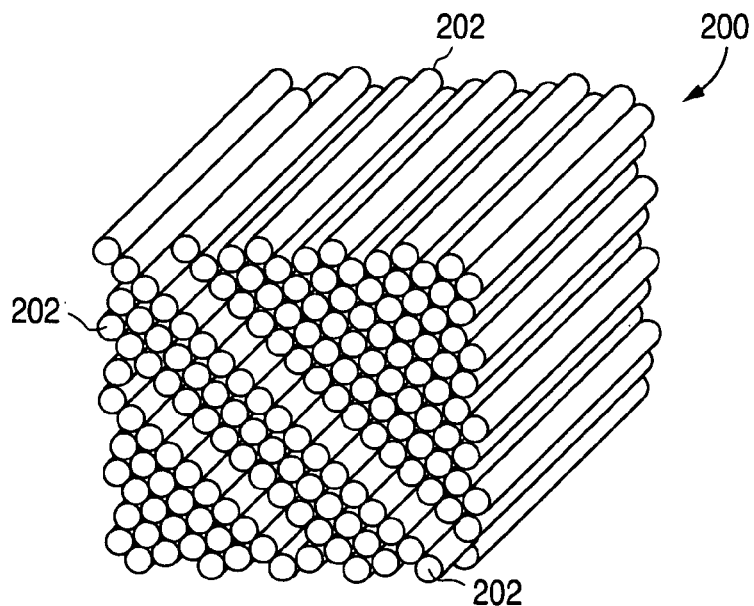
FIG. 2 is a simplified illustration of a bundle of optically transparent members in accordance with an embodiment of the present invention.

FIG. 2 is a simplified illustration of a bundle 200 of a plurality of optically transparent members 202 in accordance with an embodiment of the present invention. In one embodiment, each optically transparent member 202 can be a rod, cylinder, fiber or other similarly shaped member that can provide a pathway for light. The plurality of optically transparent members 202 is bound together (s102) along a longitudinal axis of each member. The resulting structure has a cross-section which resembles a close-packed hexagonal structure.

In one embodiment, optically transparent members 202 can be bound together to form bundle 200 using any suitable adhesive, such as a UV curable adhesive and the like. Beneficially, when using a UV curable adhesive, to form bundle 200 of optically transparent members 202, any gaps that may exist between the members are filled with the adhesive before the adhesive is cured. Alternatively, bundle 200 can be formed during a drawing/polling process.

Optically transparent members 202 can be made of a variety of materials. For example, in one embodiment, optically transparent members 202 are made of glass ($SiO_2$), plastic, polymer wires and other similar optically transparent materials.

The diameter and length of each optically transparent member 202 that make up bundle 200 are generally dictated by the application.

Figure 3A:
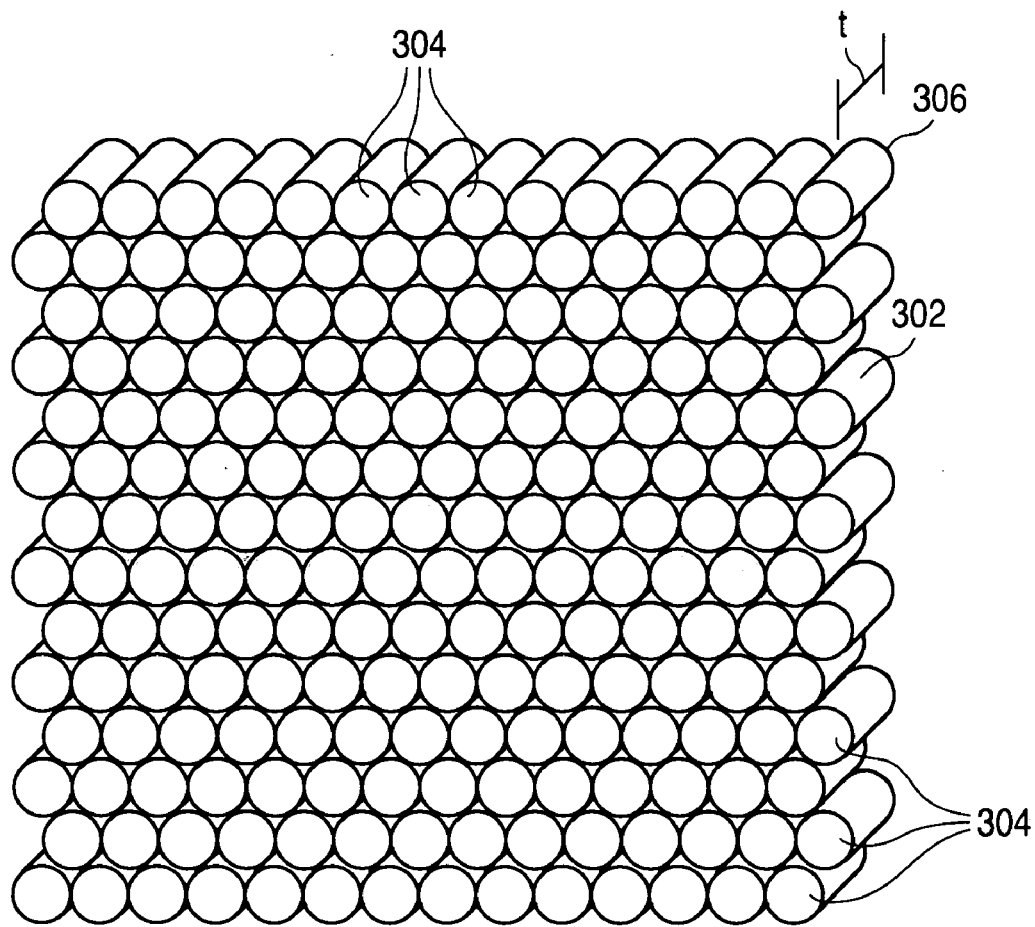
FIG. 3A is a simplified representation of a cut sheet of optically transparent member segments taken across the bundle of FIG. 2 in accordance with an embodiment of the present invention.

In one embodiment, for example, when manufacturing the microlens array, the thickness of bundle 200 (i.e. the length of members 202) is made greater than or at least equal to a desired thickness of the microlens array required by the application. For example, as shown in FIG. 3A, to ensure the proper thickness, bundle 200 can be cut (s104) into a single layer or sheet 300 to form an array of optically transparent member segments 302 having a thickness t. Accordingly, the length of optically transparent members 202 should be greater than or equal to t.

In one embodiment, for example, when providing a microlens array for an imaging system, such as a camera, the thickness of each sheet 300 of optically transparent member segments 302 can be about 100 $\mu$m, where for an image projection system using a light integrator the thickness may approach several millimeters.

In one embodiment, the diameter of each optically transparent member 202 in bundle 200 can be standard single mode fiber, which has a core size of 9 $\mu$m and an overall diameter of about 125 $\mu$m. In general, the diameter of each optically transparent member 202 can range from between about less than 1 and about several millimeters depending on the application.

Figure 7A:
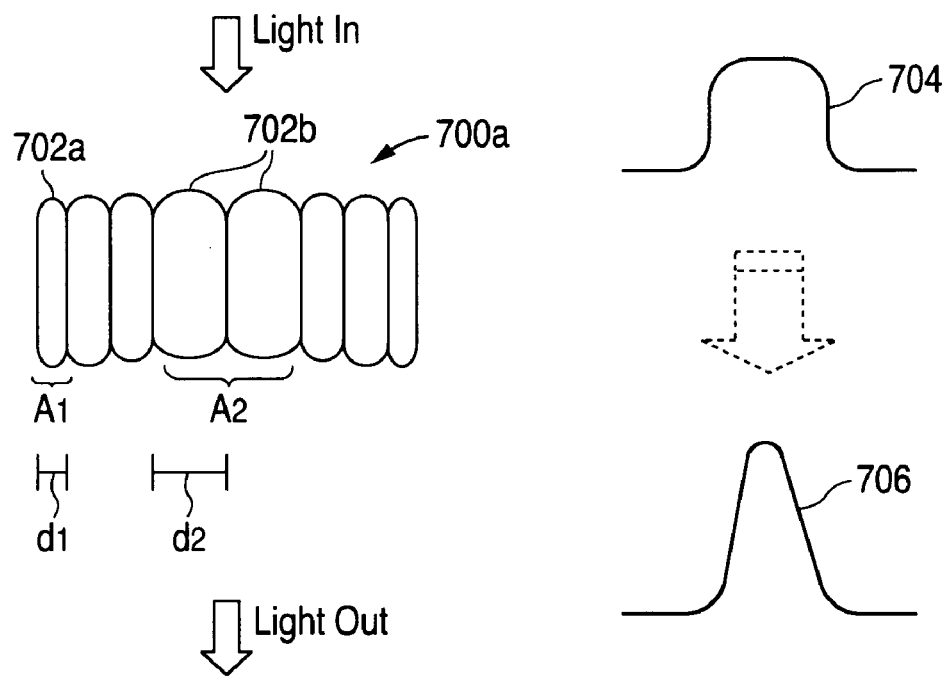
FIGS. 7A and 7B are simplified side view illustrations of a bundle of optically transparent members in accordance with an embodiment of the present invention.
Figure 7B:
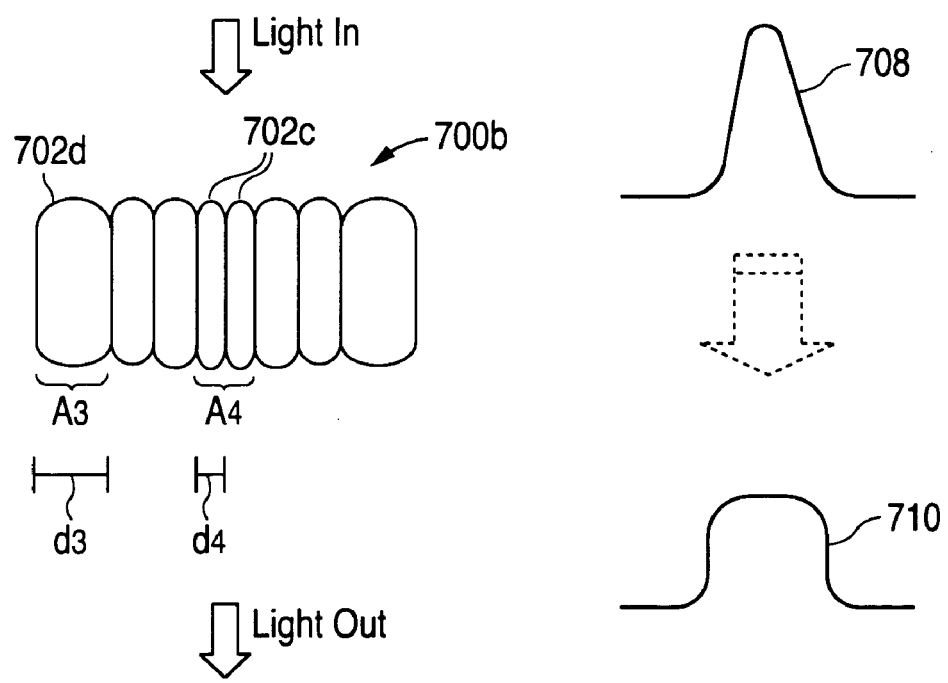

FIGS. 7A and 7B are simplified side view illustrations of yet another embodiment of bundle 700a. In this embodiment, bundle 700a can be made to include optically transparent members having individually varying diameters. For example, in FIG. 7A bundle 700a is shown having optically transparent members 702a having a diameter $d_1$ and optically transparent members 702b having a diameter $d_2$, where $d_2$ is greater than $d_1$. In this embodiment, optically transparent members 702a are disposed on the peripheral area $A_1$ of bundle 700a and optically transparent members 702b are disposed in a core area $A_2$ of bundle 700a.

In this example, the beam intensity of a light input 704 directed into a microlens array formed from bundle 700a in accordance with the principles of the present invention can be expected to be redistributed as shown in intensity curve 706. Redistribution of the light intensity is useful in systems, such as image projection systems, cameras and the like.

FIG. 7B shows bundle 700b having optically transparent members 702c having a diameter $d_4$ and optically transparent members 702d having a diameter $d_3$, where $d_3$ is greater than $d_4$. In this embodiment, optically transparent members 702d are disposed on the peripheral area $A_3$ of bundle 700b and optically transparent members 702c are disposed in a core area $A_4$ of bundle 700b.

In this example, the beam intensity of a light input 708 directed into a microlens array formed from bundle 700b in accordance with the principles of the present invention can be expected to be redistributed as shown in intensity curve 710.

Pre-bundled optically transparent members 202 of FIG. 2 designed to desired specifications to suit specific applications are commercially available, for example, from Corning, Inc. of New York.

Referring again to FIG. 3A, bundle 200 can be cut into a sheet 300 using conventional cutting technologies, such as dicing saws and cutting wheels.

Figure 3B:
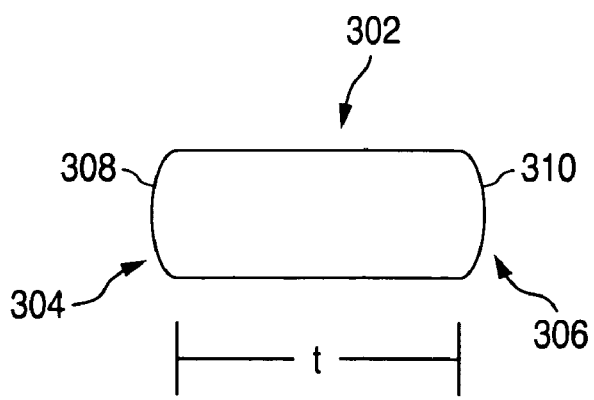
FIG. 3B is a side view of a single optically transparent member segment in accordance with an embodiment of the present invention.

As shown in FIGS. 3A and 3B, once sheet 300 of optically transparent member segments 302 is cut to a desired thickness t, faces 304 and 306 may be modified. In one embodiment, the ends or faces 304 and 306 of cut sheet 300 can be polished or otherwise "cleaned" to form a smooth flat surface on one or both ends of sheet 300.

Figure 6A:
FIGS. 6A, 6B, 6C and 6D are simplified side views of various configurations of microlens arrays in accordance with the present invention.

In another embodiment, the polishing can be used to modify the curvature, size, and related parameters of each face 304 and 306 of sheet 300 can be optimized to form a desired microlens array surface on one or both faces of the sheet. The shape of the array surface is determined by the application. For example, FIG. 6D is a simplified illustration which shows an embodiment of a microlens array surface 608 with lenses formed in a curved manner on one face. In one embodiment, the curvature of sheet face 304 of the array 608 can be controlled during the polishing process. For example, the polishing arm can be allowed to swing while rotating sheet 300 forming a curved surface of member segments 302 on face 304.

The individual shape of the ends 304 and 306 of each optically transparent member segment 302 can also be adjusted or modified to create the curvature, size, and parameters of each optically transparent member segment 302 (s107). The modifications can be accomplished using various techniques including polishing, etching, acid etching and the like. The modifications are to every member segment 302 in the sheet and are performed after bundle formation (s102), sheet formation (s104), and end modification from a flat surface (s106).

Figure 8A:
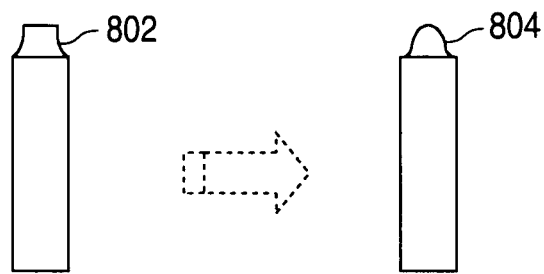
FIGS. 8A and 8B show simplified illustrations of standard cut optically transparent member segments undergoing an etch process in accordance with an embodiment of the present invention.

In one embodiment, for example, each end 304 and 306 can be modified into various shapes by etching the peripheral area of each member segment 302. For example, FIG. 8A shows a fiber segment 302 etched, such that the core area $A_1$ is raised above the peripheral area $A_2$ to form etched member segment 802 that can result in a more highly curved lens element 804 when heat is applied thereto as described below.

Figure 8B:
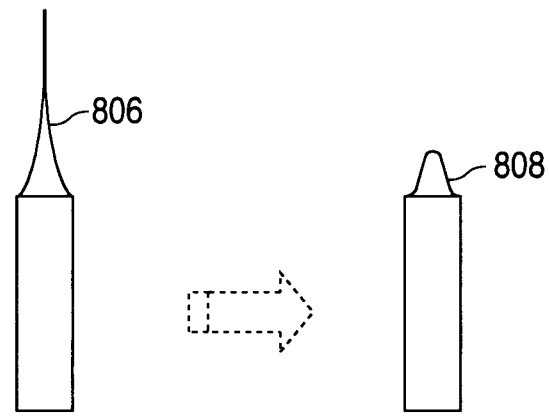

In another embodiment, shown in FIG. 8B, the etching of member segment 302 is increased to form a substantially pointed area in the core area $A_1$ and steeper slopes in peripheral area $A_2$ of etched member segment 806 that can result in an even more highly curved lens element 808 when heat is applied thereto as described below.

In one embodiment, the etching process described above can be accomplished by placing ends 304 and 306 into an HF acid bath for a specific duration of time. The acid bath affects the peripheral area $A_2$ before it affects the core area $A_1$, thus the longer the optically transparent member 302 is held in the HF acid bath, the more severe is the etch (i.e. the steeper the slope of the etched area).

Beneficially, optically transparent member segments with etched ends form lenses with shorter focal lengths and can improve light focusing.

Figure 4A:
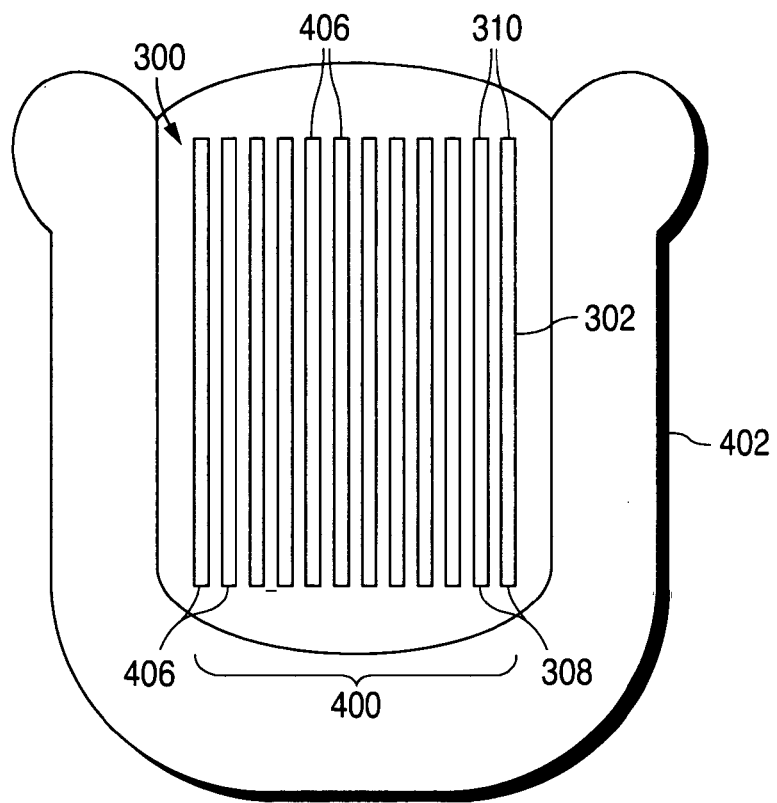
FIG. 4A is a simplified side view illustration of an array of optically transparent member segments subjected to a heating treatment in accordance with an embodiment of the present invention.

As shown in FIG. 4A, surfaces 308 and/or 310 of the array of optically transparent member segments 302, whether etched or not, are subjected to an energy source, which causes heating (s108) to form lens elements 406, which together form microlens array 400.

Figure 9:
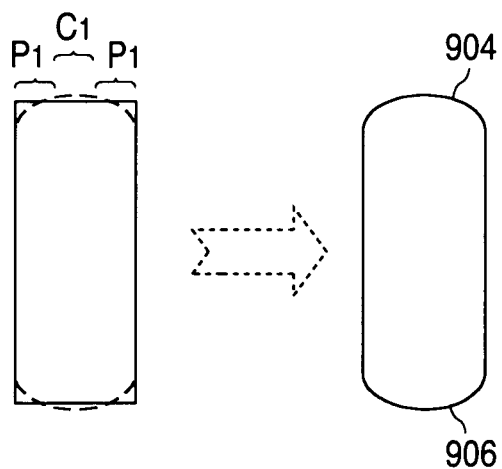
FIG. 9 is a simplified illustration of an optically transparent member segment undergoing a heat treatment in accordance with an embodiment of the present invention.

As illustrated in FIG. 9, the heat treatment causes the peripheral area $P_1$ of each member segment 302 to soften or melt faster than the core area $C_1$. The surface tension created by the unequal melting affect, causes curved surfaces to form at the ends of the member segment producing lens elements 904 and 906.

The heat treatment can be carried out using any suitable heat generation means including equivalents of the embodiment described below. Referring again to FIG. 4A, in one embodiment, the array of optically transparent member segments 302 can be placed into a furnace 402. Furnace 402 is capable of obtaining a heating level which allows for the heat treatment to be accomplished for any given optically transparent member segment material. The heat treatment cause the formation of lens elements 904 on first ends 304 and alternatively, lens elements 906 on second ends 306, if desired.

Figure 4B:
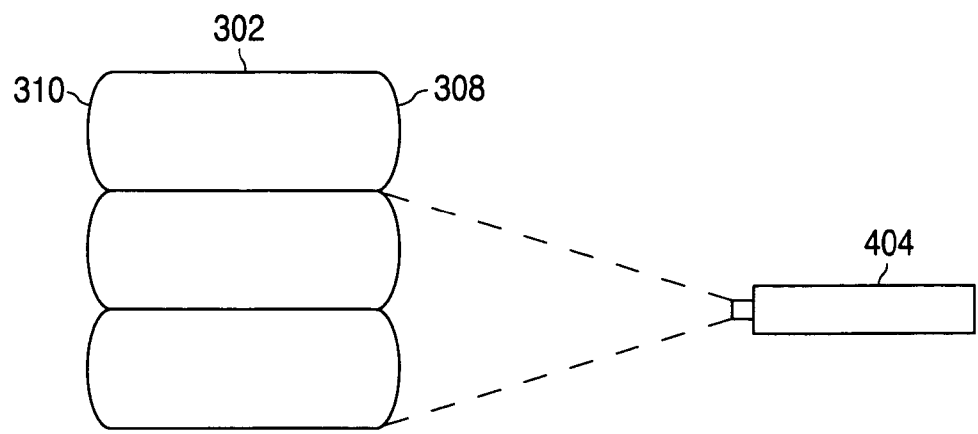
FIG. 4B is a simplified side view illustration of an array of optically transparent member segments subjected to a heating treatment in accordance with an embodiment of the present invention.

In yet another embodiment, as shown in FIG. 4B, the heat treatment can be accomplished by scanning surfaces 308 and/or 310 with a high powered laser 404 using a wavelength that can be absorbed by the optically transparent member segment material to heat the material and form lens elements 904 and/or 906. Note that in FIGS. 4A, 4B, 8A, 8B, and 9 described above, only a portion of the sheet, such as a single segment (FIGS. 8A, 8B, and 9) or a portion of one layer (FIGS. 4A and 4B), is shown for clarity. However, modification of the segment ends is performed on all fiber segments 302 from a sheet.

In other embodiments, the energy source which provides heating can be an electrical spark/arc or a glow discharge placed near the ends of optically transparent member segments.

FIG. 3B is a side view of single optically transparent member segment 302 in accordance with an embodiment of the present invention. In this embodiment, first end 304 of optically transparent member segment 302 can be modified by the heating process to have different radii of curvature in two mutually perpendicular or other different directions. The particular illustration in FIG. 3B shows a curved surface 308 on first end 304, such as an oval, semi-oval, plano/convex asphere and the like shaped lens surface, which can provide different optical performance in different optical axes relative to the major axis of the lens surface.

In one embodiment, second end 306 can also be modified to either be made flat or to have different radii of curvature in two mutually perpendicular or other different directions. FIG. 3B shows a curved surface 310 on second end 306, such as an oval or semi-oval shaped lens surface, which can provide different optical performance in different optical axes relative to the major axis of the lens surface.

The pitch and size of the microlens array can also be adjusted based on the requirements of the particular application. Manufacturing specifications and tolerances for microlens arrays are governed by the specific application and defined by the end user accordingly.

In one example, using the method of the present invention a microlens array can be made with focal length uniformity of less than 5% across the entire array, using standard single mode fiber having a diameter of about 125 $\mu$m.

Figure 5:
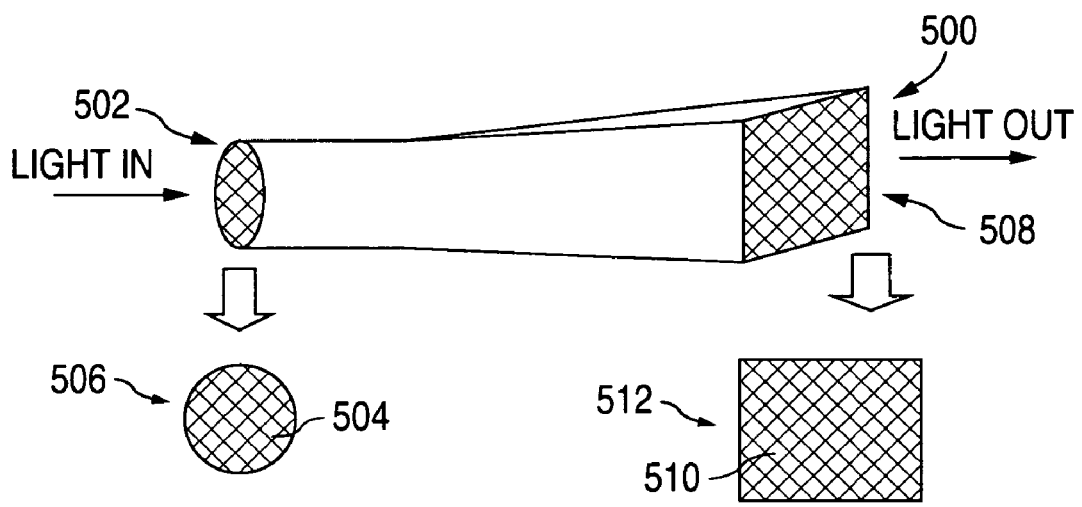
FIG. 5 is a simplified illustration of a device used for integrating and reshaping light beam in an image used in a projection system including microlens arrays in accordance with an embodiment of the present invention.

FIG. 5 illustrates an example of an application for microlens arrays made using the method of the present invention. The example includes a projection system 500 which can include multiple microlens arrays of variable sizes and shapes designed for a specific application. In one embodiment, light enters projection system 500 at a first end 502 having a first microlens array 504 with a first shape 506, for example, a round shape. The light exits projection system 500 at a second end 508 through a second microlens array 510 with a second shape 512, for example, a rectangle. As should be understood from this example the shapes and sizes of the microlens arrays can be made as desired for any application in accordance with the method of the present invention.

If necessary or desired, lens elements 406 in microlens array 400 can be coated (s110). In one embodiment, for a display screen application, microlens array 400 can be coated with anti-reflection and/or anti-glare coatings. The coatings applied to microlens array 400 can be applied by well known techniques, such as sputtering, deposition, evaporation, spraying, dipping, spinning, rolling and the like.

As previously mentioned thickness t for the microlens array can vary as can the size and shape of the lens surfaces and the number of lens sides depending on the application. FIG. 6A is a simplified illustration which shows an embodiment of a microlens array 602 having lenses formed on both sides. The thickness t of microlens array 602 can be made small, for example, between about 100 µm and about 1 millimeter.

Figure 6B:
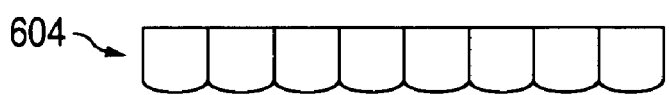

FIG. 6B is a simplified illustration which shows an embodiment of a microlens array 604 having lenses formed on both sides; however, the thickness t is considered large, for example, greater than 1 millimeter. It should be understood from these embodiments, that the thickness t can be made as desired.

Figure 6C:
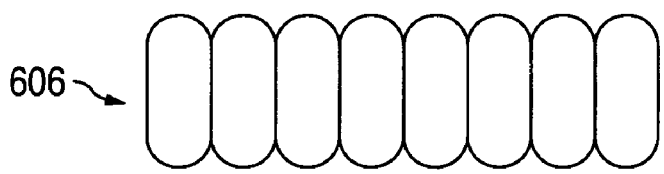
Figure 6D:
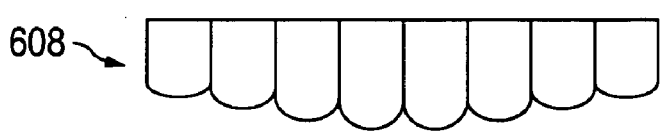

FIG. 6C is a simplified illustration which shows an embodiment of a microlens array 606 having lenses formed on one side only in accordance with an embodiment of the present invention.

The principle embodiment of the present invention described above is described for use with optically transparent members of a cylindrical shape arranged in a bundle. However, it should be understood by those of ordinary skill in the art that the principles of the present invention can apply to other similar shaped materials.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method for manufacturing a microlens array comprising:
    providing a bonded or fused bundle of optically transparent members;
    cutting the bundle of optically transparent members to form at least one sheet of optically transparent member segments; and
    heating the at least one sheet of optically transparent member segments to form individually curved lens segments.

2. The method of claim 1, further comprising modifying at least one surface of the at least one sheet of optically transparent member segments.

3. The method of claim 2, wherein said modifying comprises modifying both ends of said optically transparent member segments.

4. The method of claim 1, wherein said providing comprises adhering said optically transparent members together using an adhesive to form a close-packed hexagonal structure.

5. The method of claim 1, wherein said optically transparent members comprise a material taken from the group consisting of glass, polymer and plastic.

6. The method of claim 1, wherein said heating comprises heating an end of each optically transparent member segment to form a lens surface thereon.

7. The method of claim 6, wherein said lens surface comprises a convex, concave or planer lens surface.

8. The method of claim 1, wherein said heating comprises heating both ends of each optically transparent member segment to form a lens surface thereon.

9. The method of claim 1, wherein said at least one sheet comprises a thickness of between about 100 µm and 1 mm.

10. The method of claim 1, wherein said at least one sheet comprises a thickness of greater than 1 mm.

11. The method of claim 1, wherein said heating comprises placing said at least one sheet of optically transparent member segments into a furnace to expose ends of said optically transparent member segments to a heat source.

12. The method of claim 1, wherein said heating comprises exposing said at least one sheet of optically transparent member segments to an energy source.

13. A method for manufacturing a microlens array comprising:
    providing optically transparent cylindrical rods bundled together to form a structure having a cross section that resembles a close-packed hexagonal structure;
    cutting the bundle of optically transparent cylindrical rods to form at least one sheet of optically transparent rod segments, each optically transparent rod segment having a first end and a second end; and
    heating at least one of said ends to form individually curved lens surfaces on said ends.

14. A method for manufacturing a microlens array comprising:
    providing optically transparent cylindrical rods bundled together to form a structure having a cross section that resembles a close-packed hexagonal structure;
    cutting the bundle of optically transparent cylindrical rods to form at least one sheet of optically transparent rod segments, each optically transparent rod segment having a first end and a second end; and
    heating at least one of said ends to form a lens surface on said ends, wherein said providing comprises adhering said optically transparent cylindrical rods together using a UV curable adhesive to form said bundle.

15. The method of claim 13, wherein said optically transparent cylindrical rods comprise a material taken from the group consisting of glass, polymer and plastic.

16. The method of claim 13, further comprising modifying the shape of at least one end of each optically transparent rod segment.

17. The method of claim 13, wherein said lens surface comprises a convex, concave or planer lens surface.

18. The method of claim 13, wherein said at least one sheet of optically transparent member segments comprises a thickness of between about 100 µm and about 1 mm.

19. The method of claim 13, wherein said heating comprises placing said at least one sheet of optically transparent rod segments into a furnace to expose ends of said optically transparent rod segments to an energy source.

20. The method of claim 13, wherein said heating comprises exposing ends of said optically transparent rod segments to a light source.

* * * * *